United States Patent [19]

Olshansky et al.

[11] Patent Number: 4,941,208
[45] Date of Patent: Jul. 10, 1990

[54] HIGH PERFORMANCE SUBCARRIER MULTIPLEXED OPTICAL COMMUNICATION SYSTEM WITH MODULATION INDEX EXCEEDING UNITY

[75] Inventors: Robert Olshansky, Wayland; Vincent Lanzisera, Northboro, both of Mass.

[73] Assignee: GTE Laboratories Incorporated, Waltham, Mass.

[21] Appl. No.: 241,975

[22] Filed: Sep. 8, 1988

[51] Int. Cl.$^5$ .............................................. H04B 9/00
[52] U.S. Cl. ...................................... 455/618; 370/3; 455/610; 455/617
[58] Field of Search ............... 455/600, 606, 607, 609, 455/610, 611, 612, 613, 617, 618, 619; 370/3

[56] References Cited

U.S. PATENT DOCUMENTS

| | | | |
|---|---|---|---|
| 4,229,830 | 10/1980 | Ryan | 370/3 |
| 4,232,385 | 11/1980 | Hara | 370/3 |
| 4,601,027 | 7/1986 | Scarr | 370/3 |
| 4,701,904 | 10/1987 | Darcie | 370/3 |
| 4,772,081 | 1/1988 | Fujito | 370/3 |

OTHER PUBLICATIONS

R. Olshansky et al, Electronics Letters, vol. 23, No. 22, pp. 1196–1198 (Oct. 22, 1987).
W. I. Way et al, J. Lightwave Technol., vol. LT-5 No. 9 Sep. 1987, pp. 1325–1332.
T. E. Darcie et al, Electronics Letters, vol. 22, No. 15, pp. 774–775 (Jul. 17, 1986).
R. B. Lauer, SPIE, vol. 756, Optical Technologies for Space Communication Systems, 1987, pp. 136–141.
R. Olshansky et al, IEEE Journal of Quantum Electronics, vol. QE-23, No. 9, Sep. 1987, pp. 1410–1418.
J. Bowers, Electronics, Letters, vol. 22, pp. 1119–1121 (1986).
Mendis et al, Electronics Letters, vol 24, No. 7, pp. 442–443 (Mar. 31, 1988).

*Primary Examiner*—Benedict V. Safourek
*Assistant Examiner*—L. Van Beek
*Attorney, Agent, or Firm*—Wolf, Greenfield & Sacks

[57] ABSTRACT

An optical communication system includes an optical transmitter for transmitting a subcarrier multiplexed optical signal through a single mode optical fiber to an optical receiver. The optical transmitter includes an optical source for generating a light beam. The optical source is preferably a high speed laser diode emitting in a spectral range of 1.3–1.6 micrometers. The light beam is intensity modulated with a composite modulation signal comprising multiple modulated microwave carriers. Each of the microwave carriers intensity modulates the light beam with a modulation index $m_i$ to provide the optical signal for transmission. The total modulation index M, defined by $M = \Sigma m_i$, of the optical signal exceeds unity without degradation of the signal-to-noise ratio. By permitting the total modulation index to exceed unity, a large number of microwave carriers can simultaneously be transmitted, and the information-carrying capacity of the optical communication system is enhanced.

15 Claims, 3 Drawing Sheets

HIGH PERFORMANCE SUBCARRIER MULTIPLEXED OPTICAL COMMUNICATION SYSTEM WITH MODULATION INDEX EXCEEDING UNITY

FIELD OF THE INVENTION

This invention relates to optical communication systems wherein a light beam is intensity modulated by a plurality of microwave subcarriers and, more particularly, to optical communication systems wherein the light beam is intensity modulated by a plurality of microwave subcarriers such that the total modulation index exceeds unity.

BACKGROUND OF THE INVENTION

Optical fiber transmission systems are being extensively used in the telephone network for long distance and interoffice trunk lines because of their wide bandwidth, small size and insensitivity to electrical interference. Conventional long distance optical transmission system utilize time division multiplexed digital transmission. The maximum data rate available in commercial lightwave systems was for many years limited to 565 megabits per second, and has only recently been increased to 1.7 gigabits per second. A 565 megabits per second optical trunk line carrying 8,000 voice channels is very cost effective for voice transmission.

Recently, efforts have been made in the telecommunications industry to utilize optical transmission systems in the local, or subscriber, loop between the central office and individual subscribers. The goal is to provide not only voice, but also data and video transmission over the optical fiber to every home and business. The video services are expected to include not only broadcast services, but also switched video services which will enable each subscriber to select programming and movies from video libraries. An uncompressed digital video signal requires a data rate of about 100 megabits per second, and analog FM video requires a bandwidth of about 30 megahertz. As a result, the 565 megabit per second system, which is so effective for carrying voice channels, carries only a few video channels and must be supplemented with extensive video switching capability just to equal the channel selection presently available on cable TV. While optical fibers, laser diodes and photodiodes have more than adequate capability for bandwidths in excess of 565 megabits per second, the limiting factor is the unavailability of high speed digital electronics that are required for transmitters, for receivers and for multiplexing and demultiplexing circuits. To compete with conventional cable TV, which can provide 30 or more video channels, a subscriber distribution network based on conventional baseband digital fiber optic transmission must either operate at multigigabit per second data rates, or require extensive video switching capability.

To overcome these difficulties, microwave multiplexing of optical signals has been proposed. In these systems, a wideband microwave signal composed of many frequency multiplexed microwave carriers is used to intensity modulate a high speed laser diode. The optical signal is transmitted through a conventional single mode optical fiber to a remote location. The optical signal received at the remote location is detected with a high speed photodiode, and the transmitted signals are recovered with conventional microwave electronics. The microwave carriers can be modulated by either analog or digital signals and can be used to carry voice, data, video, digital audio, and high definition video, in almost any combination of services. Microwave modulated optical systems can be designed to transmit 4–8 gigahertz of bandwidth and can utilize the low-cost equipment presently utilized for satellite video transmission. Transmission of 60 frequency modulated video channels over 18 kilometers of optical fiber is described by R. Olshansky et al in "60-Channel FM Video Subcarrier Multiplexed Optical Communication System," *Electronics Letters*, Vol. 23, No. 22, pages 1196–1198 (Oct. 22, 1987). The transmission of ten FM video channels over 35 kilometers of optical fiber is described by W. I. Way et al in "A 1.3-μm 35-km Fiber-Optic Microwave Multicarrier Transmission System For Satellite Earth Stations," *J. Lightwave Technol.*, Vol. LT-5, No. 9, September 1987, pages 1325–1332. The transmission of three 44 megabit per second signals over two kilometers of optical fiber is described by T. E. Darcie et al in "Lightwave System Using Microwave Subcarrier Multiplexing," *Electronics Letters*, Vol. 22, No. 15, pages 774–775 (July 17, 1986). An optical local area network utilizing microwave modulation of a light beam is disclosed in U.S. Pat. No. 4,701,904 issued Oct. 20, 1987 to Darcie.

In order to provide a wide range of subscriber services, it is desirable to optimize the information-carrying capability of the optical transmission system, while maintaining high quality video transmission and low error rate digital transmission. One factor that affects both the information-carrying capability of the lightwave and the noise level or error rate is the modulation index. Each microwave carrier produces a predetermined intensity modulation of the light beam. It is known that the signal-to-noise ratio is improved by increasing the modulation index in each channel. However, when a number of microwave carriers are transmitted simultaneously, the modulation of the light beam by the individual carriers produces a composite intensity modulation that is larger than the modulation index of each channel. It has been thought necessary to maintain the total modulation index at no greater than about 25% to 35% to prevent the laser diode from becoming biased below threshold and introducing significant errors in the transmitted signal. Consequently, it was thought necessary when transmitting many microwave subcarriers simultaneously to limit the modulation index of each to a very low value and/or to limit the number of channels transmitted. In the above-referenced article by W. I. Way et al, optical modulation indices of 2% per channel or less were utilized for ten channels, resulting in a total modulation index of 20% or less.

It is a general object of the present invention to provide improved optical communication systems.

It is another object of the present invention to provide an optical communications system wherein a light beam is modulated by a plurality of microwave carriers, and the total modulation index exceeds unity.

It is a further object of the present invention to provide optical communication systems having a very large information-carrying capability.

It is still another object of the present invention to provide optical communication systems having the capability to carry voice, data and multiple video channels.

SUMMARY OF THE INVENTION

According to the present invention, these and other objects and advantages are achieved in apparatus for transmitting an optical signal. The apparatus comprises means for generating a light beam and means for intensity modulating the light beam with a composite modulation signal comprising a plurality of modulated microwave carriers. Each of the microwave carriers intensity modulates the light beam with a modulation index $m_i$ to provide an optical signal for transmission, and the total modulation index M, defined by $M = \Sigma m_i$, of the optical signal is greater than 1.

The optical transmitting apparatus typically includes means for generating a plurality of microwave carriers, means for frequency or phase modulating each of the carriers and means for adding the frequency or phase modulated carriers to provide the composite modulation signal. Preferably, the means for generating a light beam includes a high speed semiconductor laser diode, and the intensity modulating means includes means for applying the composite modulation signal to the laser diode. In a preferred embodiment, the laser diode is a high speed InGaAsP semiconductor laser emitting in a spectral range of 1.3-1.6 micrometers, and the microwave carriers are in the range between about 2 and 20 gigahertz.

According to another aspect of the invention, there is provided an optical communication apparatus including an optical transmitter as described above, receiver means remotely located from the transmitter means, including a detector responsive to the optical signal for providing the composite modulation signal and a receiver for separating and demodulating at least one of the microwave carriers from the composite modulation signal, and means for coupling the optical signal from the transmitter means and the receiver means. The coupling means preferably comprises a single mode optical fiber.

According to still another aspect of the invention, there is provided a method for transmitting an optical signal comprising the steps of generating a light beam and intensity modulating the light beam with a composite modulation signal comprising a plurality of modulated microwave carriers. Each of the microwave carriers intensity modulates the light beam with a modulation index $m_i$ to provide an optical signal for transmission, and the total modulation index M, defined by $M = \Sigma m_i$, of the optical signal is greater than 1.

By modulating the light beam with a composite modulation signal wherein the modulation index exceeds unity, a large number of microwave carriers can be simultaneously transmitted with each having a modulation index that provides an acceptable signal-to-noise ratio. If the total modulation index were restricted to one or less than one, the number of microwave carriers that could be transmitted on the light beam would be substantially reduced. It has been found that the signal-to-noise ratio of frequency modulated microwave carriers and the bit error rate of FSK modulated microwave carriers are sufficient for studio quality video when the total modulation index exceeds unity.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
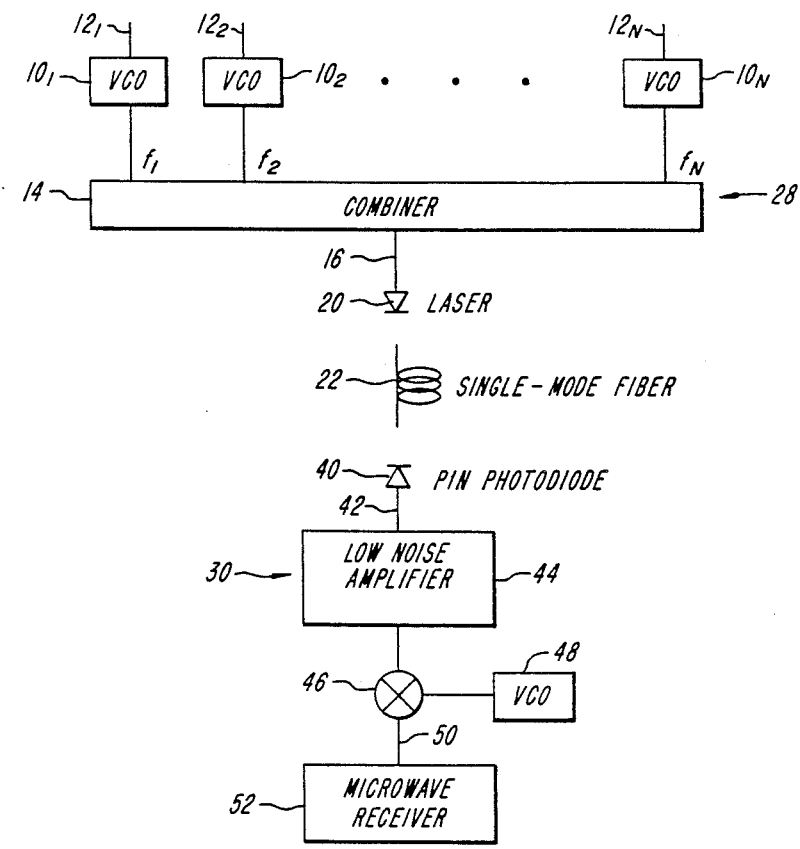
FIG. 1 is a block diagram of an optical communication system utilizing microwave subcarrier multiplexing.

A block diagram of a subcarrier multiplexed optical communication system suitable for implementation of the present invention is shown in FIG. 1. A plurality of voltage controlled oscillators, $10_1$, $10_2$—$10_N$, produce outputs in the microwave frequency range at frequencies $f_1$, $f_2$—$f_N$, respectively. Typically, the frequencies $f_1$, $f_2$—$f_N$ are in a frequency range between about 2 and 20 gigahertz. The spacing between adjacent frequencies is adequate to accommodate the expected signal bandwidths. The voltage controlled oscillators $10_1$, $10_2$—$10_N$ are modulated by signals on control lines $12_1$, $12_2$—$12_N$, respectively. The modulation signals, which can be digital or analog, produce frequency or phase variations in the outputs of the voltage controlled oscillators.

A microwave combiner 14 combines the microwave subcarriers at the outputs of voltage controlled oscillators $10_1$, $10_2$—$10_N$ to produce a composite microwave signal on an output line 16. The composite microwave signal on output line 16 is coupled to a laser diode 20 which functions as an optical transmitter. As described hereinafter, the laser diode 20 produces a light beam that is intensity modulated by the composite microwave signal from combiner 14 to provide a subcarrier multiplexed optical signal. The term "subcarrier multiplexed" refers to the fact that the primary carrier frequency is the optical signal at about $10^{14}$ Hz, while the microwave signals at $10^9$–$10^{10}$ Hz are the modulated subcarriers. The voltage controlled oscillators $10_1$, $10_2$—$10_N$, the combiner 14 and the laser diode 20 comprise a transmitter assembly 28.

The output of laser diode 20 is coupled to one end of a single mode optical fiber 22 which carries the intensity modulated optical signal to a receiver assembly 30. In a typical system, the transmitter assembly 28 and the receiver assembly 30 are remotely located from each other, and signals are coupled between them by the optical fiber 22. It will be understood that a typical subscriber loop may have many users coupled to an optical fiber. The optical fiber may include branches as necessary. Furthermore, each user is likely to have both a transmitter and a receiver. The system shown in FIG. 1 illustrates a single transmitter assembly and a single receiver assembly for ease of understanding.

The receiver assembly 30 includes a PIN photodiode 40 coupled to the other end of optical fiber 22 for receiving optical signals transmitted by laser diode 20. The photodiode 40 detects the intensity modulated optical signal and provides on an output line 42 the composite microwave signal containing the modulated microwave frequencies $f_1$, $f_2$—$f_N$. The detected signal from photodiode 40 is coupled to a low noise, wideband microwave amplifier 44. The output of amplifier 44 is coupled to one input of a mixer 46. A voltage controlled local oscillator 48 is coupled to the other input of mixer 46. The mixer 46 and local oscillator 48 convert a selected one of the microwave frequencies to a convenient intermediate frequency at an output 50 of mixer 46. The mixer output 50 is coupled to a microwave receiver 52 for demodulation of the intermediate frequency to provide the selected information signal.

As noted above, the microwave subcarriers utilized for modulation of the laser diode 20 are typically in a frequency range between about 2 and 20 gigahertz. In an example discussed below, 60 FM video channels spaced apart by 40 MHz are transmitted utilizing the 2.7-5.2 gigahertz band.

Figure 2:
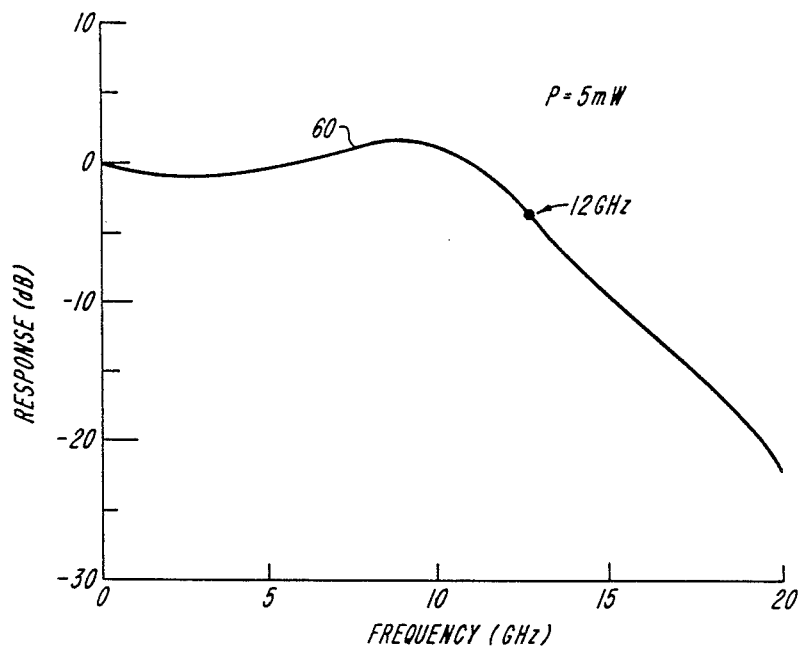
FIG. 2 is a graphic representation of the frequency response of a vapor phase regrown-buried heterostructure laser used in the optical communication system of FIG. 1.

It is apparent that the laser diode is a critical component of the transmitter assembly. In a preferred embodiment, the optical transmitter is a high frequency, vapor phase regrown-buried heterostructure InGaAsP laser emitting in a spectral range of 1.3-1.6 micrometers. The laser has a very simple mesa geometry which reduces the parasitic capacitance due to PN junctions and results in extremely good, high speed performance. A sample of 25 devices with 200 micrometer cavity lengths had an average small signal modulation bandwidth of 11 gigahertz at a dc bias of 5 milliwatts. The frequency response of a typical device biased at 5 milliwatts is shown in FIG. 2 as curve 60. The fastest devices have small signal modulation bandwidths in excess of 20 gigahertz. Further information regarding the construction and characteristics of these diodes is provided in R. B. Lauer, "Optoelectronic Componentry for the Direct Transmission of Microwave Signals Over Optical Fiber," SPIE, Vol. 756, *Optical Technologies for Space Communication Systems*, 1987, pages 136-141. and R. Olshansky et al, "Frequency Response of 1.3 Micrometer InGaAsP High Speed Semiconductor Lasers," *IEEE Journal of Quantum Electronics*, Vol. QE-23, No. 9, September, 1987, pages 1410-1418.

The photodiode 40 is an InGaAs PIN structure wherein the mesa diameter is about 30 micrometers to reduce diode capacitance and the depletion width is about 1 micrometer to reduce transit time delays. These photodiode structures produce bandwidths in excess of 15 gigahertz. Further information regarding construction of such photodiodes is provided in the aforementioned Lauer article.

In the above-described configuration, intensity modulation of the light beam is accomplished by modulation of the laser diode that generates the light beam. In another approach, a light beam is generated by any suitable means (such as a laser diode), and the light beam is coupled to an optical modulator such as a lithium niobate crystal. In this approach, light generation and modulation are accomplished separately.

One advantage of the system shown in FIG. 1 is that it uses commercially available microwave equipment. The voltage controlled oscillators $10_1$, $10_2$—$10_N$ can, for example, be fast-tuned, narrow-band oscillators, and the combiner 14 can be a conventional $1 \times N$ power combiner. In the receiver assembly 30, the low noise amplifier 44 is typically a wideband amplifier with high gain and low noise, the mixer 46 is typically a doublebalanced mixer, and the receiver 52 is typically a delay line discriminator or other type of demodulator. In one example, the amplifier 44 covered the 2-8 gigahertz band and had 40 dB gain with a 3 dB noise figure.

In the optical communication system of FIG. 1, the carrier frequencies $f_1$, $f_2$—$f_N$ are modulated with either an analog or a digital signal, $\Delta_i$. The intensity modulated signal, P(t), emitted by the laser diode 20 is given as $$P(t) = p_b[1 + \Sigma m_i \sin(2\pi f_i t + \Delta_i)] \qquad (1)$$

where $m_i$ is the modulation index in channel i (i=1, 2,—N where N is the number of channels) and $P_b$ is the power in the unmodulated light beam. The modulation index $m_i$ is the ratio of the modulation power to the total power in the unmodulated light beam. A total modulation index, M, can be defined as $$M = \Sigma m_i \qquad (2)$$

Previously, it has been assumed that a semiconductor laser cannot be modulated with a total modulation index M greater than one, because this implies that the laser would be driven below threshold and large signal errors would occur. We have discovered that it is possible to modulate a semiconductor laser with a total modulation index greater than unity and to still obtain extremely high signal-to-noise ratios. In a 60-channel transmission experiment described hereinafter in which a semiconductor laser was modulated with a modulation index M as high as 1.4, a 60 dB weighted signal-to-noise ratio was obtained. In other experiments, a laser has been modulated with a 120-channel signal having a modulation index M greater than 3.0, and a 56 dB weighted signal-to-noise ratio has been obtained.

Semiconductor lasers can be modulated at indices greater than unity because in subcarrier multiplexed systems, the N information channels operate at random phases with respect to each other. The root mean square (rms) time average modulation index, $M_{rms}$, is given as $$M_{rms} = [\Sigma m_i^2]^{\frac{1}{2}} \qquad (3)$$

In the case of an equal modulation index, $m_i$, for each channel, the rms index is equal to $N^{\frac{1}{2}}m$. When 60 channels are operated at a modulation index m of 0.024 per channel, the total modulation index M is 1.44, but the rms modulation index $M_{rms}$, is 0.19. Although the modulation index at any one instant can exceed the rms value and can exceed unity for short periods of time, our experiments demonstrate that this does not impair the system performance as determined by the measured signal-to-noise ratio and as judged by received video picture quality.

It will be understood that the optical communication system can be operated with a total modulation index, M, that exceeds unity only where there are multiple subcarriers of random phase relative to each other. Thus, for example, a single subcarrier cannot be operated with a modulation index that exceeds unity, and subcarriers that have fixed relative phase relationships cannot be operated with modulation indices that exceed unity. It is believed, however, that the total modulation index, M, can exceed unity for any system having three or more microwave subcarriers with random, or unsynchronized, phase relationships It will be understood that the maximum usable modulation index per channel depends in part on the number of channels in the system. For a 100-channel system, the modulation index per channel is limited to about 1%-2%, whereas for a 1,000- channel system, the modulation index per channel is limited to about 0.1%–0.2%.

In accordance with the present invention, the optical communication system is configured such that the total modulation index, M, as defined by equation (2) exceeds unity. Operation of a subcarrier multiplexed system with a modulation index greater than unity enables either an increase in the number of channels or an increase in the optical link budget. For example, a system operating with a total modulation index, M, of 1.5 can have 50% more information channels than a system operating with an index of 1.0. Alternatively, if the number of desired information channels is fixed, then operating with a total modulation index, M, of 1.5 allows a 50% increase in the modulation index per channel. This produces a 3.5 dB increase in the receiver carrier-to-noise ratio. This increase can be used to reduce the specifications on other components in the system, such as amplifier noise figure, photodiode responsivity, laser to fiber coupling efficiency, etc.

Figure 3:
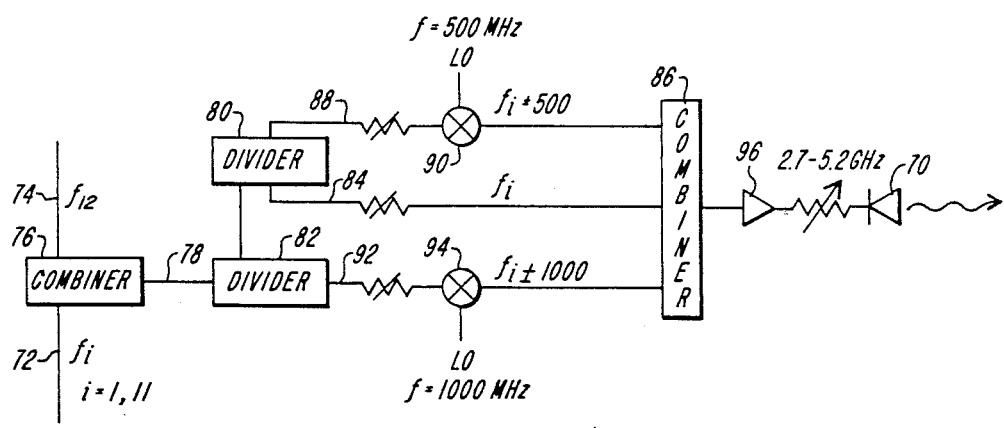
FIG. 3 is a block diagram of a 60-channel optical transmitter in accordance with the present invention.

In an example of the present invention, 60 FM video channels have been transmitted over 18 kilometers of single mode optical fiber using the 2.7–5.2 gigahertz band. A block diagram of the 60-channel subcarrier multiplexed transmitter is shown in FIG. 3. Sixty FM microwave carriers are electrically combined and are used to intensity modulate a 1.3 micrometer, high speed vapor phase regrown buried heterostructure laser diode 70. At 5 milliwatts bias, the laser bandwidth is 11 gigahertz and the relative intensity noise is less than $-135$ dB/Hz. The 60-channel video source was obtained by taking a signal 72 from a C-band satellite (3.7–4.2 gigahertz) carrying eleven channels and adding a locally-generated signal 74 for a total of twelve channels. The signals 72 and 74 are combined by a combiner 76, and the 12-channel microwave signal 78 from combiner 76 is power divided into three branches by dividers 80 and 82. A first branch 84 is coupled to a combiner 86, a second branch 88 is shifted by $\pm 500$ megahertz by a mixer 90, and a third branch 92 is shifted by $\pm 1,000$ megahertz by a mixer 94. The outputs of mixers 90 and 94 are coupled to combiner 86. The microwave output signal from combiner 86 is coupled through a wideband amplifier 96 to laser diode 70. The output signal from amplifier 96 modulates the light beam generated by laser diode 70. The microwave output of the combiner 84 is in the 2.7–5.2 gigahertz band.

The locally-generated signal 74 was obtained by directly modulating a voltage controlled oscillator with a preemphasized baseband video signal. The presence of the locally-generated signal permitted the direct measurement of the carrier-to-noise ratio (CNR) for the unmodulated carrier and of the weighted signal-to-noise ratio (SNR) using locally-generated test signals.

The optical signal was transmitted over 18 kilometers of single mode fiber, including four GTE elastomeric splices and having a total optical loss of 8 dB. The fiber coupled power was 700 microwatts and the system operated with 4 dB of margin. The signal was detected with a high speed, GaInAs PIN diode with a bandwidth of 20 gigahertz and a responsivity of 0.7 A/W. An optical attenuator was used to set the direct photocurrent at 30 microamps, a value appropriate for a subscriber distribution link having a total optical loss budget of 8 dB and 4 dB margin. The receiver corresponded to the receiver assembly 30 shown in FIG. 1. The signal from the photodiode 40 was amplified with a 2–8 gigahertz low noise amplifier 44 with a noise figure of 3 dB. The signal was downconverted to a 950 to 1450 megahertz IF using mixer 46 and oscillator 48. The FM signal was demodulated using a low-cost, 12-channel satellite video receiver with a 30 megahertz video bandwidth.

Figure 4:
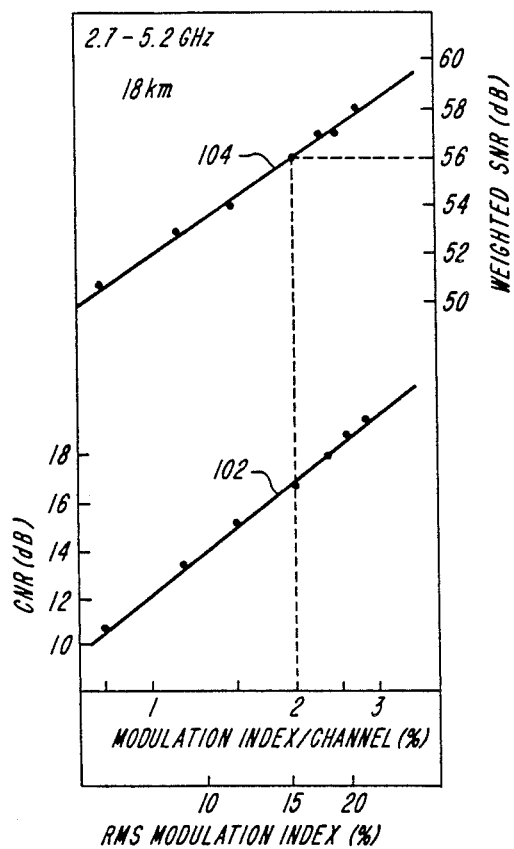
FIG. 4 is a graphic representation of carrier-to-noise ratio and weighted signal-to-noise ratio as a function of modulation depth for the 60-channel subcarrier multiplexed optical transmitter of FIG. 3.

The CNR for a 30 megahertz noise bandwidth was measured as a function of modulation index for the unmodulated carrier using a spectrum analyzer, and the result is shown in FIG. 4 as curve 102. The weighted SNR was determined using a Tektronix video signal generator and an NTSC vectorscope. The weighted SNR versus modulation index is also shown in FIG. 4 as curve 104.

For the 60-channel signal transmitted over 18 kilometers of single mode fiber, a CNR of 16.5 dB produces a 56 dB weighted SNR. The optical modulation index was determined by using a 10 dB tap to measure the rf signal output of the low noise amplifier 44, and then correcting for the measured net gain of the optical fiber, amplifier and tap. The 56 dB weighted SNR is achieved with a modulation depth, m, of 2% per channel. The rms modulation depth for all N channels is $mN^{\frac{1}{2}}$ and was measured to be 15.8%.

As noted above, the total optical modulation index can be defined as mN, where N is the number of channels. For the 60-channel system at the operating point which gives a 56 dB SNR, the product $mN = 1.2$. Signals from the N FM channels, however, add incoherently, and the rms modulation depth is only 15.8%. No degradation in measured SNR has been observed until the value of mN exceeds about 1.4.

It will be understood that the optical transmission technique wherein the total modulation index, M, exceeds unity, is not limited to the system configuration disclosed herein. The optical transmission technique of the invention can be applied to any subcarrier multiplexed optical system, including broadcast systems, controlled switching systems and the like. While the technique is most useful for transmission of wideband video signals, any other signals can be transmitted, and the subcarrier modulation can be either digital or analog. Furthermore, while the optical signal is most advantageously carried on an optical fiber, it can also be transmitted through space or through any suitable optical transmission medium.

While there has been shown and described what is at present considered the preferred embodiments of the present invention, it will be obvious to those skilled in the art that various changes and modifications may be made therein without departing from the scope of the invention as defined by the appended claims.

What is claimed is:

1. Apparatus for transmitting an optical signal, comprising:
   means for generating a light beam; and
   means for intensity modulating the light beam with a composite modulation signal comprising a plurality of modulated microwave carriers, each of said microwave carriers intensity modulating said light beam with a modulation index $m_i$ to provide an optical signal for transmission, wherein the total modulation index M, defined by $$M = \Sigma m_i,$$

of the optical signal is greater than one.

2. Optical transmitting apparatus as defined in claim 1 further including:

means for generating said modulated microwave carriers; and means for adding said modulated carriers to provide said composite modulation signal.

3. Optical transmitting apparatus as defined in claim 1 wherein said means for generating a light beam includes a semiconductor laser diode and wherein said intensity modulating means includes means for applying said composite modulation signal to said laser diode.

4. Optical transmitting apparatus as defined in claim 1 wherein the number of microwave carriers is at least three.

5. Optical transmitting apparatus as defined in claim 1 wherein the modulation index $m_i$ of each microwave carrier is at least 0.001.

6. Optical transmitting apparatus as defined in claim 3 wherein said laser diode is a high speed InGaAsP laser emitting in a spectral range of 1.3–1.6 micrometers.

7. Optical transmitting apparatus as defined in claim 1 wherein said microwave carriers are in the frequency range between about 2 and 20 gigahertz.

8. A method for generating an optical signal that is intensity modulated by a plurality of microwave carriers, comprising the steps of:

generating a light beam with a laser diode having sufficient modulation bandwidth to accommodate said plurality of microwave carriers;

modulating each of said microwave carriers;

combining said microwave carriers after frequency or phase modulation thereof to provide a composite modulation signal; and intensity modulating said light beam with said composite modulation signal to provide an optical signal, each of said microwave carriers intensity modulating the optical signal with a modulation index $m_i$, wherein the total modulation index M, defined by $$M = \Sigma m_i,$$

of the optical signal is greater than one.

9. A method for transmitting an optical signal, comprising the steps of:

generating a light beam;

intensity modulating the light beam with a composite modulation signal comprising a plurality of modulated microwave carriers, each of said microwave carriers intensity modulating said optical signal with a modulation index $m_i$ to provide an optical signal for transmission, wherein the total modulation index M, defined by $$M = \Sigma m_i,$$

of the optical signal is greater than one; and transmitting the optical signal to a remote location.

10. A method for transmitting an optical signal as defined in claim 9 wherein the step of transmitting the optical signal includes transmitting the optical signal on an optical fiber.

11. A method for transmitting an optical signal as defined in claim 9 further including the steps of generating said modulated microwave carriers, and adding said modulated microwave carriers to provide said composite modulation signal.

12. Optical communication apparatus comprising:

transmitter means including means for generating a light beam and means for intensity modulating the light beam with a composite modulation signal comprising a plurality of modulated microwave carriers, each of said microwave carriers intensity modulating said light beam with a modulation index $m_i$ to provide an optical signal for transmission, wherein the total modulation index M, defined by $$M = \Sigma m_i,$$

of the optical signal is greater than one;

receiver means remotely located from said transmitter means, including a detector responsive to said optical signal for providing said composite modulation signal and a receiver for separating and demodulating at least one of said microwave carriers from said composite modulation signal; and means for coupling said optical signal from said transmitter means to said receiver means.

13. Optical communication apparatus as defined in claim 12 wherein said coupling means comprises a single mode optical fiber.

14. Optical communication apparatus as defined in claim 12 wherein said transmitter means further includes;

means for generating said modulated microwave carriers; and means for adding said modulated microwave carriers to provide said composite modulation signal.

15. Optical communication apparatus as defined in claim 12 wherein said means for generating a light beam includes a semiconductor laser diode and wherein said intensity modulating means includes means for applying said composite modulation signal to said laser diode.

* * * * *